April 7, 1942.                J. M. CRAWFORD ET AL                2,279,261
                                 TORSION GRAVIMETER
                               Filed Oct. 25, 1939                2 Sheets-Sheet 1

INVENTORS
John Marion Crawford
Harold Raymond Prescott
BY
ATTORNEY

April 7, 1942.  J. M. CRAWFORD ET AL  2,279,261
TORSION GRAVIMETER
Filed Oct. 25, 1939  2 Sheets-Sheet 2

INVENTORS
John Marion Crawford
Harold Raymond Prescott
BY
ATTORNEY

UNITED STATES PATENT OFFICE 2,279,261

TORSION GRAVIMETER

John Marion Crawford and Harold Raymond Prescott, Ponca City, Okla., assignors to Continental Oil Company, Ponca City, Okla., a corporation of Delaware Application October 25, 1939, Serial No. 301,218

7 Claims. (Cl. 265—1.4)

Our invention relates to a torsion gravimeter, and more particularly to an improvement over the torsion gravimeter invented by Lewis M. Mott-Smith and described in Letters Patent of the United States 2,130,648.

Gravity meters are employed in exploring for and locating subsurface tectonic formations and, to be of practical value, these instruments must be able to detect very small variations of the whole force of gravity.

The instrument shown by Dr. Mott-Smith comprises a frame supporting a torsion fiber which suspends a weight arm carrying a pointer. The instrument is made entirely out of quartz to avoid differential expansion due to temperature changes, and the construction is such that elastic "after effect," known as elastic "hysteresis" is avoided. A labilizer fiber connected to a spring arrangement at one end and to the weight arm at the other end, is provided. The torsion fiber and the labilizer fiber extend at right angles to each other and in the same horizontal plane.

The torsion gravimeter shown in Patent 2,130,648 is free from hysteresis and is stable in actual field use, giving dependable and accurate information of the intensity of gravity variations, provided the temperature and pressure are maintained sufficiently constant.

We have shown the Mott-Smith gravimeter in Figure 1 of the drawings, in which a T-shaped frame 3 is supported in the gravimeter housing by a clamp 2. The arms 4 of the frame support the main torsion fiber 5 which suspends the weight arm 7. The weight arm 7 is provided with a counterbalance 14 and a pointer arm 12 carrying a pointer 12a which is viewed by a microscope 15 to read changes in gravity. The labilizer fiber 8 has one end thereof secured to a primary spring 9 which is supported from a secondary spring 10. An adjusting spring 11 enables the tension of the main torsion fiber 5 to be controlled. The weight arm 7 has a projection 13 to which quartz may be fused or from which quartz may be removed to adjust the balance of the arm.

The labilizer fiber 8 of the Mott-Smith gravimeter increases the period of a system causing it to be more sensitive to changes in intensity of gravity.

We have found in actual use that the Mott-Smith system does not have the same calibration characteristics at one value of the total intensity of gravity as it has at a different value of the total intensity of gravity. The instrument, accordingly, must be re-calibrated, whenever any appreciable change occurs in the total intensity of gravity.

A word concerning the physical explanation of this phenomenon may be helpful. In the construction of the Mott-Smith gravimeter, a twist of 100° in the main torsion fiber 5 may be used. The angular twist in the primary spring 9 cannot be very great due to structural reasons. A value of about 5° or 10° twist in the primary spring 9 is as large a value as can be employed and enable the stability of the weight arm to be maintained. Let us suppose that the Mott-Smith instrument is moved to a place having a sufficient increase in the total intensity of gravity that the pointer arm 12 moves one degree. It will be clear that the twist in the main torsion fiber 5 has increased from 100° to 101° and the calibration would be in error about one percent, provided the change in the main fiber 5 were the only controlling factor. When final adjustments are made, the torque exerted by the labilizer opposes that exerted by the main torsion fiber, so that the resultant torque controlling the movement of the beam as the gravitational force varies is the difference between the two opposing torques. Since the labilizer torque and main fiber torque are very nearly equal in magnitude, a slight non-linearity in either would show up as a much greater fraction of the resultant torque than of the original torque.

It is also obvious that the more nearly the two opposing torques approach each other in magnitude, the greater the departure of the coupled system from performance predicted by a calibration taken at a different angle of rotation of the beam system, that is, at a location where the total gravitational force is widely different. In actual practice, these torques are very nearly equal in magnitude and hence any non-linearity in either torque is magnified considerably as it appears in the performance characteristics of the finished instrument. It will be understood by those skilled in the art that it is desirable to increase the angular twist of the main spring arm 9 to at least 100° in order that the labilizer may approach the same linearity of calibration as is present in the main fiber.

Non-linear performance characteristics make it necessary to re-calibrate the instrument whenever the total intensity of gravity alters appreciably. This is a time consuming and difficult task. This is especially true in areas where no suitable gravity stations are available, having known gravity differences. Furthermore, the terrain being surveyed is often large and the instrument will then be in error on part of the area when the total intensity of gravity changes appreciably. This further complicates the problem of obtaining a wide area gravity survey having the required degree of reliability.

In the construction shown in the Mott-Smith gravimeter, an initial twist of 100° in the arm of main spring 9 could not be achieved and, at the same time, maintain proper instrumental stability. The spring arm in such case would have to be very light and flimsy in order to obtain the small force needed, when it would move laterally as the beam changed with the total change of intensity of gravity. Furthermore, the light spring arm which would be required would be susceptible to seismic vibrations, resulting in the introduction of erratic forces on the labilizer fiber 8, which, in turn, would cause erratic beam observations. Then, too, the characteristics of the flimsy spring arm 9 which would be required could not be duplicated with any degree of precision. This would result in instruments having widely different performances and calibration characteristics, preventing the uniformity desired.

One object of our invention is to provide a novel gravimeter having uniform calibration characteristics for wide variations in the intensity of gravity.

Another object of our invention is to provide a torsion gravimeter which is very sensitive to minute changes in the force of gravity, which is not objectionably affected by disturbing influences and provided with a new and improved labilizer system.

Other and further objects of our invention will appear from the following description.

In the accompanying drawings which form part of the instant specification and are to be read in conjunction therewith and in which like reference numerals are used to indicate like parts in the various views.

Figure 1:
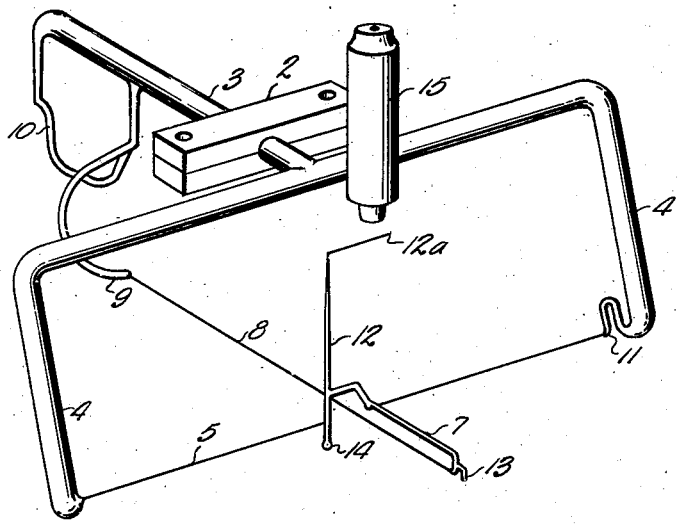
Figure 1 is a perspective view of a Mott-Smith torsion gravimeter.

A clamp 2 supports the quartz frame 3 of our instrument in a suitable housing provided with temperature controlling means such as a thermostatically controlled bath, well known to the art, whereby to keep the temperature within the housing at a uniform point. The quartz framework 3 comprises two U-shaped arms 4a and 4', fused to a supporting arm of quartz 3' which is supported by the clamp 2. The weight arm 7a is secured to a U-shaped member 6a provided with a counterweight 6'. The weight arm and U-shaped member 6a are supported by the main torsion fiber 5 which is fused at 5b to quartz adjustment spring 5c. The weight arm 7a has an extension 12a forming a pointer which is viewed by a microscope 15. An extension 13a is fused to one end of the labilizer fiber 8. The other end of the libilizer fiber is fused to the arm 27 of a symmetrical quartz cross 26. The cross 26 is suspended by labilizer torsion fiber 25, the ends of which are fused to one arm 4' at 25a and to adjusting spring 25c at 25b. The cross 26 is rotated to give the proper twist, thus insuring the required small force on the labilizer fiber 8. The upper arm 28 and the lower arm 27 of the cross are substantially equal in mass, size and length so that the system is balanced so far as gravity pulls are concerned. In this manner, it will be clear that variations of total gravity will not, as far as the labilizer itself is concerned, cause a change of force on the fiber 8. The labilizer torsion fiber 25 may be tightened to give a vibrational frequency of the labilizer cross 26 in excess of 100 cycles. This makes the labilizer quite stable so far as the low frequency, large amplitude seismic vibrations are concerned, as well as giving the labilizer excellent stability in all directions. The size of the labilizer torsion fiber 25 and the length of arms 27 and 28 are selected to give excellent linear characteristics with wide changes in total gravity. The initial twist of the labilizer torsion fiber 25 may be as great as several complete turns if such linearity is required. In practice, we find that a twist from 100° to 200° is sufficiently linear. The torsion fiber 5 and the labilizer 8 may be in the same horizontal plane so that the labilizer fiber will pass through the axis of the torsion fiber. It is understood, of course, that the torsion fibers, weight arms, and framework are all made out of the same material, preferably quartz.

Figure 3:
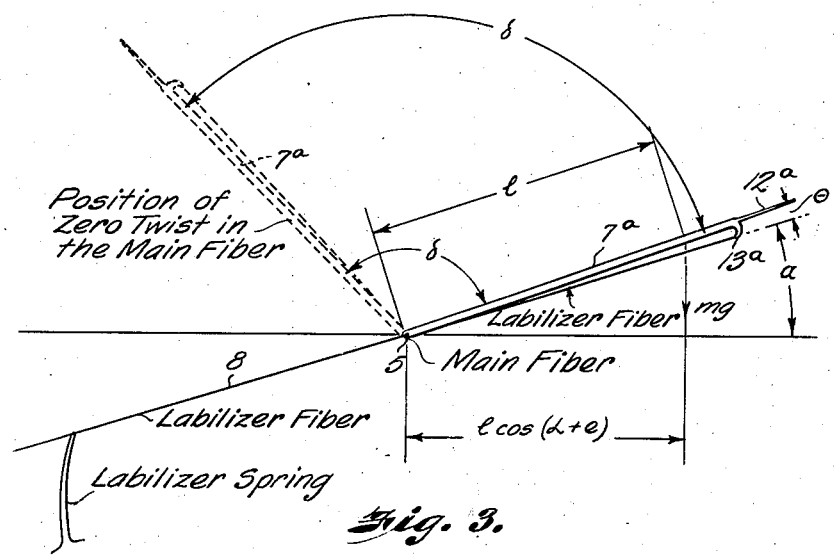
Figure 3 is a diagrammatic sectional view of a torsion gravimeter.

Referring now to Figure 3, let $l$ equal the distance from the center of gravity of the beam 7a to the main torsion fiber 5. Let $mg$ represent the weight of the beam 7a. Let $\delta$ represent the angle from the position of zero twist in the main fiber to the angle $\alpha$.

The equation of equilibrium may be expressed as follows:

(1) $\quad mgl \cos(\alpha+\theta) = k_1(\delta-\theta) + k_2\theta + k_3\theta^2 + k_4\theta^3 \ldots$ Where $mgl \cos(\alpha+\theta)$ = torque caused by gravity pull.

Where $k_1(\delta-\theta)$ = restraining torque of main fiber 5 twisted through an angle $(\delta-\theta)$.

Where $\theta$ is the angle reading of the beam microscope.

Where $\alpha$ is the angle from the horizontal to the beam microscope.

Where $k_2\theta + k_3\theta^2 + k_4\theta^3 \ldots$ is the torque contributed by the labilizer spring and fiber.

For this case the labilizer force is not linear and this complicates the mathematical treatment of performance and calibration data.

However, with the labilizer system disclosed the labilizer torque is substantially linear and may be expressed simply as: Labilizer torque $= k_2\theta$.

For this case the equilibrium equation is:

(2) $\quad mgl \cos(\alpha+\theta) = k_1(\delta-\theta) + k_2\theta$

Using partial derivatives the following is found:

(3) $\quad \dfrac{\delta f}{\delta \theta} d\theta = -mgl \sin(\alpha+\theta) d\theta + k_1 d\theta - k_2 d\theta$ (4) $\quad \dfrac{\delta f}{\delta \alpha} d\alpha = -mgl \sin(\alpha+\theta) d\alpha$ (5) $\quad \dfrac{\delta f}{\delta g} dg = +ml \cos(\alpha+\theta) dg$ From the well known relation:

$$\dfrac{\delta f}{\delta \theta} d\theta + \dfrac{\delta f}{\delta \alpha} d\alpha + \dfrac{\delta f}{\delta g} dg = 0$$

We obtain:

(6) $\quad [-mgl \sin(\alpha+\theta) + k_1 - k_2] d\theta - [mgl \sin(\alpha+\theta)] d\alpha + [ml \cos(\alpha+\theta)] dg = 0$ or:

(7)

$$dg = \dfrac{[+mgl \sin(\alpha+\theta) - k_1 + k_2] d\alpha + [mgl \sin(\alpha+\theta)] d\alpha}{ml \cos(\alpha+\theta)}$$

(8)
$$dg = g\tan(\alpha+\theta)(d\theta+d\alpha) + \frac{(k_2-k_1)d\theta}{ml\cos(\alpha+\theta)}$$

(9)
$$\frac{dg}{d\theta} = g\tan(\alpha+\theta)\left(1+\frac{d\alpha}{d\theta}\right) + \frac{k_2-k_1}{ml\cos(\alpha+\theta)}$$

Let
$$\frac{k_2-k_1}{ml} = gK$$

Then:

(10)
$$\frac{d\theta}{dg} = \frac{1}{g\left[\tan(\alpha+\theta)\left(1+\frac{d\alpha}{d\theta}\right) + K/\cos(\alpha+\theta)\right]}$$

In normal use the level ($\alpha$) is held constant from one field station to another such that $d\alpha/d\theta = 0$

(11)
$$\frac{d\theta}{dg} = \frac{1}{g[\tan(\alpha+\theta) + K/\cos(\alpha+\theta)]}$$

Constant $\alpha$

This is the equation of gravity sensitivity.

At any given field station, with the gravity ($g$) constant, the performance of the beam ($\theta$) may be determined when the level ($\alpha$) is varied.

(12)
$$\frac{d\alpha}{d\theta} = -\frac{\delta f}{\delta \theta}\Big/\frac{\delta f}{\delta \alpha} = -\left(\frac{-mgl\sin(\alpha+\theta) + k_1 - k_2}{-mgl\sin(\alpha+\theta)}\right)$$

Constant $g$

(13)
$$\frac{d\theta}{d\alpha} = \frac{-1}{1 + K/\sin(\alpha+\theta)} \text{ constant } g$$

This is the equation of level sensitivity.
From Equation 12 we also obtain:

(14)
$$g\sin(\alpha+\theta) = \frac{-(k_2-k_1)}{ml\left(\frac{d\alpha}{d\theta}+1\right)}$$

(15)
$$g\tan(\alpha+\theta) = \frac{-(k_2-k_1)}{ml\cos(\alpha+\theta)\left(\frac{d\alpha}{d\theta}+1\right)}$$
$$= \frac{-(k_2-k_1)d\theta/d\alpha}{ml\cos(\alpha+\theta)\left(1+\frac{d\theta}{d\alpha}\right)}$$

Substituting this in the Equation 11 gives, when $\alpha+\theta$ is small:

(16)
$$\frac{d\theta}{dg} = \frac{ml\cos(\alpha+\theta)}{k_2-k_1}\left[\frac{d\theta}{d\alpha}\right] + \frac{ml\cos(\alpha+\theta)}{k_2-k_1} = \frac{1}{gK}\left[\frac{d\theta}{d\alpha}\right] \frac{1}{gK}$$

This is a straight line relation between gravity sensitivity ($d\theta/dg$) and level sensitivity ($d\theta/d\alpha$) of slope $1/gK$ and holds only if the individual values of $d\theta/d\alpha$ are found with $g$ constant and the individual values of $d\theta/dg$ are found with $\alpha$ constant.

If in the use of the instrument, the level $\alpha$ is not held constant as gravity differences are measured, we may define:

$$\alpha = \alpha_0 + \Delta\alpha;\ \beta = \theta + \Delta\alpha\ (\theta = \beta - \Delta\alpha)$$

The equation of equilibrium is (from 2)

(2) $\quad mgl\cos(\alpha+\theta) - k_1(\delta-\theta) - k_2\theta = 0$

(17) $\quad mgl\cos(\alpha_0+\Delta\alpha+\theta) - k_1(\delta-\beta+\Delta\alpha) + k_2(\beta-\Delta\alpha) = 0$

(18) $\quad mgl\cos(\alpha_0+\beta) - k_1(\delta-\beta) - k_2(\beta) - \Delta\alpha(k_1-k_2) = 0$

(19)
$$\frac{\delta f}{\delta \beta}d\beta = -[(mgl\sin(\alpha_0+\beta) + k_2 - k_1)]d\beta$$

(20)
$$\frac{\delta f}{\delta \Delta\alpha}d\Delta\alpha = (k_2-k_1)d\Delta\alpha$$

(21)
$$\frac{\delta f}{\delta g}dg = ml\cos(\alpha_0+\beta)dg\frac{\delta f}{\delta \beta}d\beta +$$
$$\frac{\delta f}{\delta \Delta\alpha}d\Delta\alpha + \frac{\delta f}{\delta g}dg = 0$$

(22) $\quad -[mgl\sin(\alpha_0+\beta) + k_2 - k_1]d\beta + [k_2-k_1]d\Delta\alpha + ml\cos(\alpha_0+\beta)dg = 0$

(23)
$$dg = \left[\frac{mgl\sin(\alpha_0+\beta) + k_2-k_1}{ml\cos(\alpha_0+\beta)}\right]d\beta - \frac{k_2-k_1}{ml\cos(\alpha_0+\beta)}d\Delta\alpha$$

Let
$$g_0 K' = \frac{k_2-k_1}{ml\cos(\alpha_0+\beta)}$$

(24) $\quad dg = g_0[\tan(\alpha_0+\beta) + K']d\beta - g_0K'd\Delta\alpha$
$\quad\quad dg = g_0[\alpha_0+\beta+K']d\beta - g_0K'd\Delta\alpha$ nearly $\alpha_0+\beta$ is small such that $\tan(\alpha_0+\beta) = \alpha_0+\beta$ nearly

(25) $\quad \Delta g = g_0\int(\beta+\alpha_0+K')d\beta - g_0K'\int d\Delta\alpha$

(26) $\quad \Delta g = \frac{g_0\beta^2}{2} = g_0\beta(\alpha_0+K') - g_0K'\Delta\alpha$ Using the previously defined $\beta = \theta + \Delta\alpha$

(27) $\quad \Delta g = \frac{g_0\theta^2}{2} + g_0\theta(\alpha_0+K') + g_0\theta\Delta\alpha + g_0\Delta\alpha(\alpha_0+K')$
$$+ \frac{g_0\Delta\alpha^2}{2} - g_0K'\Delta\alpha$$

(28) $\quad \Delta g = \frac{g_0\theta^2}{2} + g_0\theta(\alpha_0+K') + g_0\Delta\alpha(\theta+\alpha_0) + \frac{g_0\Delta\alpha^2}{2}$ This is the general equation involving the three variables $\theta$, $\Delta\alpha$ and $\Delta g$.

This is valid for linear performance only.

Figure 2:
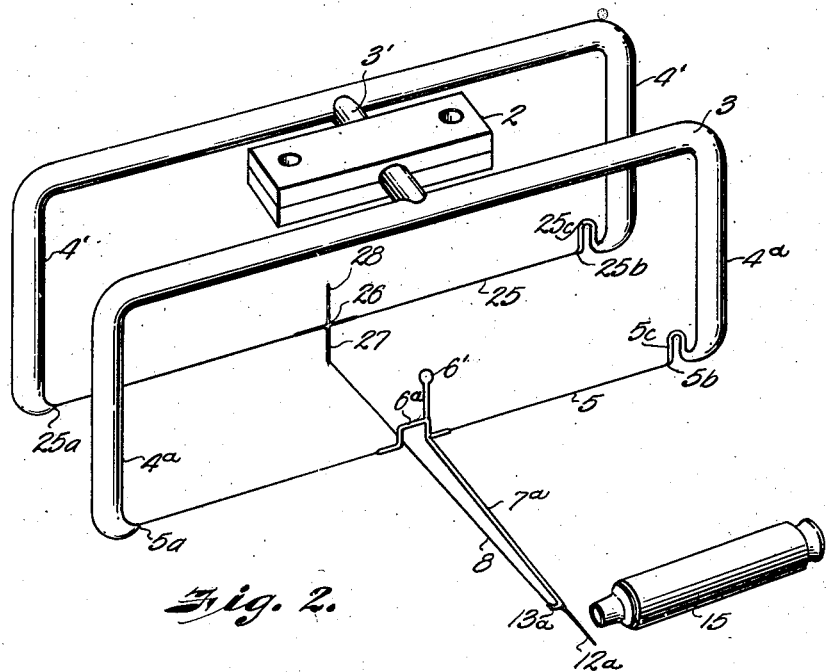
Figure 2 is a perspective view of a gravimeter of our invention.
Figure 4:
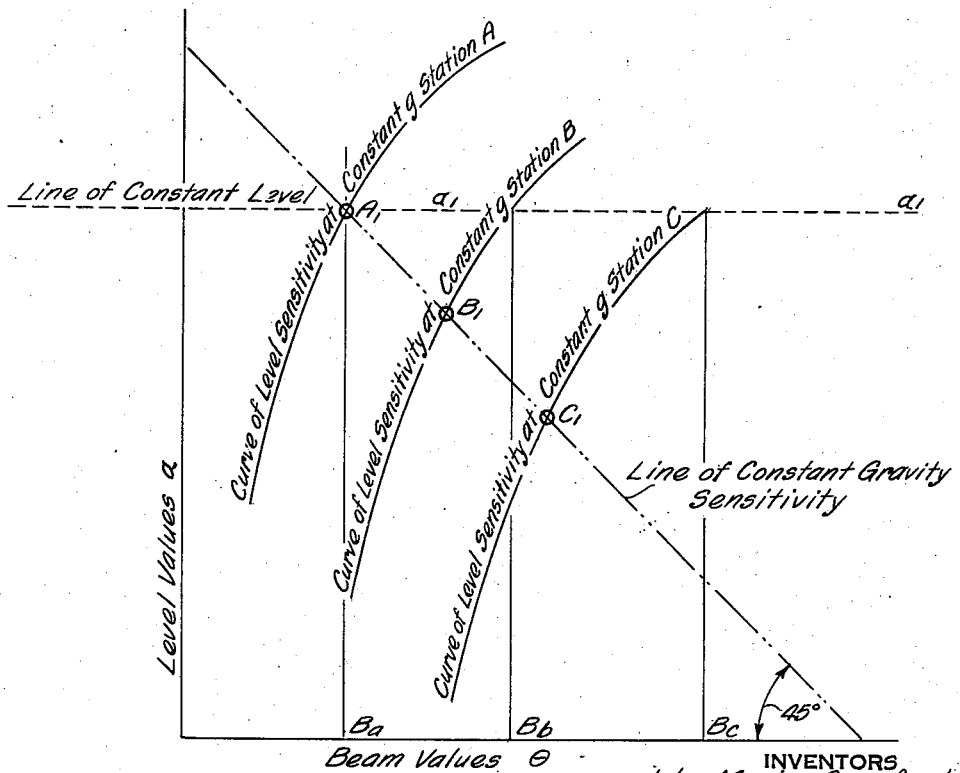
Figure 4 is a curve showing the performance features of a gravimeter of our invention.

Figure 4 shows the performance features of the gravimeter of our invention. Beam readings are plotted as abscissae and level values are plotted as ordinates. The beam readings are obtained from the microscope 15 shown in Figure 2. The level values are obtained from any sensitive level, well known to those skilled in the art.

At station A a curve of level sensitivity involving values of $\alpha$ and $\theta$ are shown. These are obtained with a constant value of gravity at station A. At station B a curve of level sensitivity involving values of $\alpha$ and $\theta$ are shown at a new constant value of gravity at station B.

At station C a third level sensitivity curve is shown at the gravity at station C.

Now in one scheme of field use a constant value of $\alpha$ may be maintained—say $\alpha_1$. At station A the beam reading would be Ba, at station B the beam reading would be Bb and at station C the beam reading would be Bc, as shown on the Figure 3. Knowing these beam differences and knowing the calibration characteristics of the instrument the gravity differences may be calculated.

From the Equation 11 the gravity sensitivity is:

$$\frac{d\theta}{dg} = \frac{1}{[g\tan(\alpha+\theta) + K\cos(\alpha+\theta)]}$$

If a constant gravity sensitivity is desired: i. e.

$$\frac{d\theta}{dg} = \text{constant}$$

Then $\alpha+\theta$ equal constant.

This is a straight line of 45 degree slope as shown in Figure 4 "Line of constant gravity sensitivity."

If a sensitivity to gravity represented by the point A1 is selected at station A, then the same sensitivity will be found on the station B curve at the point B1 and likewise the same sensitivity will be found on the station C curve at point C1.

This means that if the instrument has linear force characteristics as the value of gravity is changed the level sensitivity curve at station A will match the station B level sensitivity curve if it is moved along the 45 degree line and superimposed. Likewise the station A level sensitivity curve will match the station C level sensitivity curve if moved along the 45 degree line and superimposed.

In the instrument where a linear labilizer has been provided as in this invention these curves will superimpose and therefore wide areas may be explored where the calculated gravity differences will be correct without resorting to laborious corrective calibration measures.

In the instrument of Patent 2,130,648, it is found that as the gravity is changed the curves will not match when moved along the 45 degree line and superimposed. It is found that one will have greater curvature than the other and this tendency becomes progressively more pronounced as greater gravity variations are included.

For such a meter laborious corrective calibration measures are desirable even in small areas and the corrective measures are necessary when large areas are explored.

In the actual case values of $\alpha$ and $\theta$ are not observed in radians.

Let $S_b$ equal beam readings.
Let $S_1$ equal level readings.
Let $S_b$ equal $k_1\theta$. Let $S_1$ equal $K_2\alpha$.

If the values shown in Figure 4 are in $S_b$ and $S_1$ readings instead of $\theta$ and $\alpha$ (radians) then the slope of the line of constant sensitivity will no longer be 45 degrees.

The angle (with the horizontal) will be equal $$\arctan \frac{K_2}{K_1}$$

It will be seen that we have accomplished the objects of our invention. The forces are sufficiently linear in performance in our system that wide changes of total gravity will result in linear variations of the forces involved and additional calibrations or corrective calculations are eliminated. Gravity differences can be obtained more accurately and furthermore, gravity differences as determined on adjacent areas will match or dovetail without corrective calculations because of the linear calibration characteristics of our gravimeter. The lateral stability of the labilizer torsional fiber and the high vibrational frequency of the cross 26 of our system make it far less susceptible to seismic vibrations. The construction, however, is such that it will supply the required small force needed. More accuracy is normally available, particularly in areas where seismic vibrations are severe. This freedom from seismic disturbances allows us to employ auxiliary temperature control equipment to greater advantage. As has been pointed out above, it is customary to place the gravimeter in a bath of fluid maintained at a fixed temperature. To facilitate this operation, the fluid is usually stirred. In the Mott-Smith gravimeter, shown in Patent 2,130,648, the system is sufficiently sensitive to seismic disturbances that the stirring means must be temporarily shut off when readings are taken. This alters the temperature characteristics and increases the discrepancy between the actual temperature and the required constant temperature. As long as our system is more stable to seismic disturbances, the stirring means of the temperature control arrangement may be left in operation during the time readings are taken, resulting in a more accurate temperature control.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A gravity surveying instrument including in combination a supporting means, a first torsion fiber supported by said means, a second torsion fiber supported by said means in spaced relation to said first fiber, a weight arm extending substantially in a horizontal plane fixed to and carried by said first torsion fiber, a labilizer arm extending substantially in a vertical plane fixed to and carried by said second torsion fiber, and a labilizer fiber extending between said labilizer arm and said weight arm.

2. A gravity surveying apparatus including in combination a support having two pairs of spaced arms, a torsion fiber stretched between one pair of said arms and lying substantially in a horizontal plane, a second torsion fiber stretched between the other pair of arms and lying substantially in a plane passing through said first torsion fiber, a weight arm lying substantially in a horizontal plane extending from and supported by said first torsion fiber, a labilizer arm lying substantially in a vertical plane extending from and supported by said second torsion fiber, and a labilizer fiber having its ends connected to said labilizer arm and said weight arm whereby the torsion in said second torsion fiber will accentuate the movements of said weight arm, said support, torsion fibers, weight arm, labilizer arm and labilizer fiber being of the same elastic material and integrally united.

3. A gravity surveying apparatus having a first torsion fiber and a second torsion fiber, a weight arm connected to said first torsion fiber and a labilizer arm connected to said second torsion fiber, said labilizer arm having a counterbalancing extension, and a labilizer fiber connected to said weight arm and said labilizer arm, whereby the torsion in said second fiber will accentuate the movements of said weight arm, the arrangement being such as to have substantially uniform calibration characteristics.

4. A gravity surveying apparatus including in combination a torsion fiber, a weight arm connected to said torsion fiber and extending substantially in a horizontal plane, a labilizer torsion fiber, a labilizer arm extending substantially in a vertical plane carried by said labilizer torsion fiber, said labilizer arm having a counterbalancing arm of equal mass, size and length extending from said labilizer arm to balance gravity pulls on said labilizer arm, and a labilizer fiber connected to said labilizer arm and to said weight arm.

5. A gravity surveying apparatus including in combination a first torsion fiber, a second torsion fiber, a weight arm connected to said first torsion fiber, a labilizer arm connected to said second torsion fiber, the twist in said torsion fibers being substantially equal, and a labilizer fiber connected to said weight arm and said labilizer arm to accentuate the movement of said weight arm under the influence of gravity.

6. A gravity surveying apparatus including in combination a support comprising a pair of U-shaped members having two pairs of arms, a main torsion fiber supported by one pair of arms, a labilizer torsion fiber supported by the other pair of arms, a weight arm supported by said main torsion fiber and extending laterally therefrom, a counterbalanced labilizer arm supported by said labilizer torsion fiber, and a labilizer fiber connected to said weight arm and said labilizer arm, said labilizer fiber and said main torsion fiber lying substantially in the same plane.

7. A gravity surveying apparatus including in combination a main torsion fiber, a weight arm connected to and extending laterally from said main torsion fiber, a labilizer torsion fiber, a labilizer arm connected to and extending downwardly from said labilizer torsion fiber, a counterbalance supported by said labilizer arm and extending upwardly therefrom, a labilizer fiber extending between said labilizer arm and said weight arm and passing substantially through the axis of said main torsion fiber, said main torsion fiber, weight arm, labilizer torsion fiber, labilizer arm, counterbalance, and labilizer fiber being of the same elastic material and integrally united.

JOHN MARION CRAWFORD.
HAROLD RAYMOND PRESCOTT.